United States Patent
Marckini et al.

(10) Patent No.: US 7,244,365 B2
(45) Date of Patent: Jul. 17, 2007

(54) PROCESS FOR SAFELY DECONTAMINATING THE CHILL WATER USED IN MEAT PROCESSING

(75) Inventors: Scott A. Marckini, Kansas City, MO (US); Ronald G. Martin, Ruston, LA (US); Russell L. Sims, West Monroe, LA (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 714 days.

(21) Appl. No.: 10/693,812

(22) Filed: Oct. 24, 2003

(65) Prior Publication Data
US 2005/0048174 A1    Mar. 3, 2005

Related U.S. Application Data

(60) Provisional application No. 60/421,643, filed on Oct. 28, 2002.

(51) Int. Cl.
*C02F 1/76* (2006.01)

(52) U.S. Cl. .................. 210/746; 210/754; 210/764
(58) Field of Classification Search ............... 210/96.1, 210/192, 198.1, 746, 754, 758, 764
See application file for complete search history.

(56) References Cited

U.S. PATENT DOCUMENTS

| | | | |
|---|---|---|---|
| 5,227,306 A | 7/1993 | Eltomi et al. | 436/55 |
| 5,348,664 A * | 9/1994 | Kim et al. | 210/746 |
| 5,389,390 A | 2/1995 | Kross | 426/332 |
| 5,635,231 A | 6/1997 | Bender et al. | 426/332 |
| 5,683,724 A | 11/1997 | Hei et al. | 424/616 |
| 6,605,253 B1 * | 8/2003 | Perkins | 422/28 |
| 7,077,967 B2 * | 7/2006 | Perkins et al. | 210/760 |
| 2004/0232087 A1 * | 11/2004 | Roensch et al. | 210/754 |

* cited by examiner

*Primary Examiner*—Matthew O. Savage
(74) *Attorney, Agent, or Firm*—David L. Hedden

(57) ABSTRACT

This invention relates to a process for safely decontaminating the chill water used in meat processing. The decontaminant used in the process is chlorine dioxide.

15 Claims, 1 Drawing Sheet

PROCESS FOR SAFELY DECONTAMINATING THE CHILL WATER USED IN MEAT PROCESSING

CROSS REFERENCE TO RELATED APPLICATIONS AND CLAIM TO PRIORITY

This application claims the benefit of provisional application Ser. No. 60/421,643 filed on Oct. 28, 2002.

BACKGROUND OF THE INVENTION

1. Field of the Invention

This invention relates to a process for safely decontaminating the chill water used in meat processing. The decontaminant used in the process is chlorine dioxide.

2. Description of the Prior Art

Freshly slaughtered poultry or other meat products are contaminated with pathogenic microorganisms. These microorganisms are present both on the surfaces of the animals, as well as in the intestinal tracts immediately after slaughter or evisceration. To insure product safety, recent federal regulations require microbiological testing rather than visual inspection. These regulations require that carcasses be tested for Salmonella.

A number of processes, which employ biocides for the pathogen control, have been proposed to decontaminate the chill water used to process poultry and other meat products. These processes include the use of chlorine-based sanitizers, chlorine dioxide, acidified sodium chlorite solutions, ozone and peracetic acid, but there are problems associated with using these chemicals. Ozone has poor persistence, while peracetic acid is only effective in high doses. Chlorine based sanitizers are inexpensive, but are less effective particularly at higher chill water pH. Chlorine dioxide is more effective, but can create health problems for workers exposed to it.

U.S. Pat. No. 5,389,390 suggests a process for removing bacteria from poultry, which involves using aqueous solution containing about 0.001% to about 0.2% by weight of a metal chlorite, such that the chlorite ion is in the form of chlorous acid. While this process is capable of controlling some of the microorganisms in the chill water, it does not provide flexibility with respect to adjusting the feed rate of metal chlorite to the process water being treated as the demand of the treated water increases. In addition, chlorous acid is not as effective in reducing pathogenic organisms such as salmonella and *E. coli.*

U.S. Pat. No. 5,227,306 suggests a process and apparatus that provide flexibility for adjusting the feed and feed rate of chlorine dioxide to an aqueous system. The chlorine dioxide is generated on-site by an external generator, and the feed and feed rate are automatically controlled by means of a multiple feedback loop system. This process provides adequate oxidative treatment while avoiding overfeed or underfeed conditions. However, the applications described in the patent do not relate to systems where food and people are exposed to the chlorine dioxide, and does disclose the use of an air monitoring system, which would shut down the unit should vapor levels exceed defined limits.

U.S. Pat. No. 5,635,231 suggests a process for treating poultry and red meat that removes, retards, or reduces bacterial growth. The processes involve spraying the meat, either prior to or after introducing the meat into the chiller, with a solution of trialkali metal phosphate to decontaminate the meat. One of the problems with this process is that high amounts of the phosphate are used, which are discharged into the environment. U.S. Pat. No. 5,700,507 teaches that the discharge can be minimized if the trialkali metal phosphate is used in conjunction with a steam treatment.

U.S. Pat. No. 5,683,724 describes an automated process for inhibiting microbial growth in aqueous food transport or process streams. In this process, a percarboxylated acid, such as peracetic acid, is used as the microbiological control agent. The amount of percarboxylated acid fed is controlled by maintaining an ORP between 280 and 460 mV. The patent notes that the use of chlorine dioxide is undesirable, because it is a toxic gas and has an acceptable air concentration limit of 0.1 ppm. Exposure to levels above this amount may cause headaches, nausea, and respiratory problems. The patent goes on to note that expensive and intricate safety devices and/or equipment are needed when using chlorine dioxide as a decontaminant, in order to monitor the level of chlorine dioxide and maintain concentrations below 0.1 ppm. The art described in the invention addresses these concerns and provides a solution in a safe manner.

Clearly, there is a need in the meat processing industry for a process that effectively decontaminates the meat as well as the process water, which does not damage the meat being treated, and also insures the safety of workers connected with the treatment process.

All citations referred to under this description of the "Related Art" and in the "Detailed Description of the Invention" are expressly incorporated by reference.

BRIEF SUMMARY OF THE INVENTION

This invention relates to a process for safely decontaminating the chill water used in meat processing. The process is carried out once an operational signal, which is monitored, is received from the poultry chill system indicating that there is chill water in the chill bath. The process comprises:

(a) measuring the oxidative-reduction potential of the chill water in the chill bath of the chiller, preferably with an oxidative-reduction potential sensor, prior to introducing the meat to be processed and chlorine dioxide into the chill water, in order to obtain a reference oxidative-reduction potential for said chill water, (b) introducing the meat to be processed into the chill water, (c) feeding chlorine dioxide, preferably an aqueous solution of chlorine dioxide, to said chill water to achieve a predetermined target oxidative-reduction potential in the chill water from between 400 mV to 750 mV, more preferably from 475 mV to 700, and most preferably from 580 mV to 680 mV, wherein said chlorine dioxide is preferably generated on site by means of a chlorine dioxide generator achieving a generation efficiency of at least 90%, wherein the concentration of chlorine dioxide fed is from 100 ppm to 3000 ppm, preferably of 750 ppm to 2000 ppm, and wherein the amount of chlorine dioxide fed is sufficient to increase the oxidative-reduction potential of the chill water to a level that exceeds the reference oxidative-reduction potential established in (a), and achieves the target oxidative-reduction potential referenced in (c), provided that the level of chlorine dioxide in the chill water does not exceed a residual level of 3.0 ppm;

(d) monitoring the oxidative-reduction potential of the chill water;

(e) monitoring the level of chlorine dioxide gas in the atmosphere surrounding the chill water; and (f) terminating the flow of chlorine dioxide into the chill water, if the oxidative-reduction potential exceeds 750 mV, if the oxidative-reduction potential of the chill water meets the target established in (c), or if the level of chlorine dioxide gas in the atmosphere surrounding the chill water exceeds 0.3 ppm., preferably 0.25 ppm.

The process described herein effectively decontaminates the chill water used in processing poultry, does not damage the meat treated, and insures the safety of workers connected with the treatment process.

DETAILED DESCRIPTION OF THE INVENTION

Figure 1:
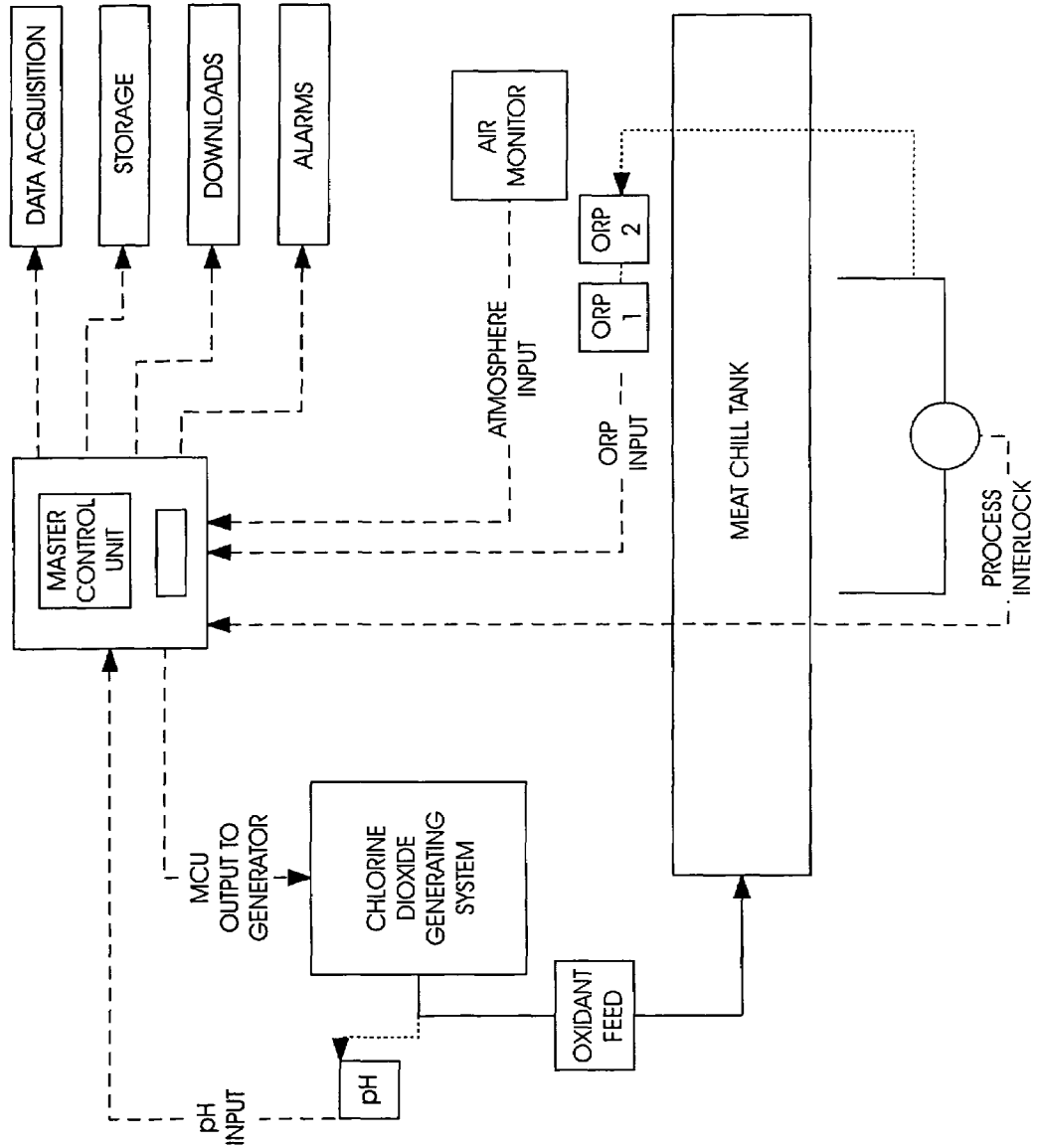
FIG. 1 is drawing that shows the equipment used in the process for decontaminating the chill water used in processing poultry.

For purposes of this invention, "meat" means animal protein derived from beef, lamb, poultry, seafood, and the like, most typically poultry and seafood.

Any chiller that contains a chilled water bath to chill the meat carcasses can be used. Although in some chillers, the chilled water bath is not circulated, i.e., the water either remains in the chiller or is used one time only and discharged, typically the chiller re-circulates the chilled water. When processing meat for human consumption, it is necessary that the slaughtered, eviscerated meat carcasses be chilled as rapidly as possible.

Examples of chillers include "drag type chillers", as disclosed in U.S. Pat. No. 4,788,831 and "auger-type chillers", as disclosed in U.S. Pat. No. 5,868,000.

Before adding the meat to the chill water, the meat is scalded, eviscerated, cropped, boned, gutted, and/or degutted, and washed. In some cases, the meat is first treated with a trialkali phosphate, peracetic acid or acidified chlorite to help remove fecal matter and control $E.\ coli$. Chill water temperature varies and is typically set by plant requirements and good manufacturing practices, however, prechill water cannot exceed 65° F. while chill water is typically maintained below 40° F.

For purposes of this invention, "chlorine dioxide" includes an aqueous solution of chlorine dioxide. Chlorine dioxide may be generated on-site using techniques and equipment well-known in the art. For instance, chlorine dioxide solution can be generated on-site using an alkali chlorite and chlorine gas; an alkali chlorite and hypochlorite with mineral acid or an alkali chlorate and mineral acid. Examples of generation equipment suitable for use in the process are described in U.S. Pat. Nos. 4,013,761 and 4,147,115. Various means may be used to control the delivery of sodium chlorite and other chemicals to the generator. Such means include, but are not limited to, variable rate pumps, valves, eductors and metering devices. The chlorine dioxide is fed to the chill water at levels, so that residual levels do not exceed 3.0 ppm, and preferably is between 0.1 ppm to 0.5 ppm.

The feed and feedrate of chlorine dioxide can be regulated by multiple, redundant oxidation-reduction (ORP) technology analyzers, sensors, and a Master Control Unit. See, for example, U.S. Pat. No. 5,227,306, which describes how to proportionally feed $ClO_2$ to an aqueous system. Alternatively, it may also be fed through an on/off cycling mechanism based upon the ORP.

The total control system consists of a Master Control Unit, which is a PLC (programmable logic controller)-based system comprising control logic and an operator interface. Any PLC and operator interface-based system can be used. The Master Control Unit regulates all aspects of feeding $ClO_2$ to the chill water and provides a safety interlock to prevent overfeed of chlorine dioxide, so that effective operation is insured in a safe manner. The master control unit also initiates alarms, collects and stores critical operating data, and provides a means to download said data either remotely or locally. Remote download may be accomplished via telephone or cellular technology.

The oxidative-reduction potential of the chill water is preferably measured with an oxidative-reduction potential sensor. Sensors, typically having probes, which are in direct contact with the chill water, are connected to the ORP analyzer. These sensors are in direct contact with the chill water. The primary ORP analyzer monitors the oxidative-reduction potential of the chill water and feeds the information to the Master Control Unit. The Master Control Unit then regulates the feed of chlorine dioxide to the meat chill water, based upon input from the ORP analyzer.

The operation of ORP sensors is less than optimal, because of the presence of greasy poultry fat or skin, which can lodge against the probe of the sensor and coat the sensor. This can result in readings that do not accurately reflect the oxidative state of the chill water, and cause an underfeed or overfeed of chlorine dioxide.

To solve this problem, the process preferably uses two or more ORP analyzers and sensors, both of which monitor the chill water. The master controller continuously monitors and compares the two analyzers. If a discrepancy exists between the analyzers, which exceeds a preset limit, the master controller immediately initiates a probe wash. If the discrepancy remains after the probe wash, the unit automatically signals an alarm condition. This redundancy ensures continuous system control for reliability, safety, and pathogen control. In addition to a probe wash, a back flush of the probes with fresh water may be present and initiated in response to the conditions above.

A primary safety feature of the design is an interlock design between the Master Control Unit and the operation of feeding the chlorine dioxide to the chill water from the chlorine dioxide generators. The Master Control Unit requires a signal from the chiller, indicating that there is water in the chiller, before the chlorine dioxide generators can begin feeding chlorine dioxide to the chill water. This signal could be detected from any number of mechanical, electrical or pneumatic devices that would indicate that a chiller is in operation such as valves, auger motors or chain motors. Preferably it would a signal from an ammonia refrigeration system through which the chill water flows and is typically obtained from a slip stream of water taken from the chill box, which is routed through the refrigeration system via a rechill pump or recirculating pump. The rechill pump or refrigeration system is preferably interlocked with the Master Control Unit. The interlock device insures that chill water is in place before chlorine dioxide is introduced to the chiller and it prevents the escape of airborne chlorine dioxide gas, which could pose a personnel hazard.

Another feature of the ORP control function is the alarm system, which is activated at both high and low ORP levels. The low-level alarm is activated to notify personnel that insufficient oxidant residual may be present in the chill water, which could result in unacceptable levels of pathogenic bacteria. The high-level alarm is activated to notify key personnel of the potential of exceeding upper regulatory limits for chlorine dioxide in the process water systems Both process variables are monitored and alarms indicated by the Master Control Unit. The high level alarm will also suspend chlorine dioxide feed when the acceptable amount is exceeded.

Another element of the process involves the use of chlorine dioxide-specific air quality monitors. The maximum air concentration limit for chlorine dioxide over an 8 hour period is 0.1 ppm. Exposure in excess to this level may lead to headaches, nausea, and respiratory problems and needs to be guarded against. Multiple chlorine dioxide-specific air quality monitors are incorporated into the system design and placed at key points around the immediate vicinity of the chillers. The monitors are placed at or above or below the chillers, typically 25 feet away, but preferable 5 to 10 feet away. Preferably, there is an electronic or electrical connection between the air monitors and the master controller so that output signals from the air monitor can pass to the Master Control Unit. In the event the air quality is unacceptable and exceeds preset limits of 0.1 ppm (equivalent to the OSHA PEL), the master control unit will initiate an alarm. If the air quality exceeds a failsafe limit of 0.25 ppm (which we have selected to be just below the OSHA STEL), the master controller will terminate the flow of chlorine dioxide into the chill water and initiate a second alarm.

The air quality monitors are connected to the Master Control Unit and continuously monitors air quality. As the monitor continuously samples the atmosphere, it provides a chlorine dioxide concentration readout locally, as well as remotely, through a 4–20 mA signal. If air quality deteriorates due to increasing levels of chlorine dioxide the Master Control Unit initiates an automatic shutdown of the chlorine dioxide generation system and automatically notifies key personnel. If air quality improves and contaminant levels fall below preset limits, the Master Control Unit initiates start-up of the chlorine dioxide generators and feed of oxidant will resume to the chill water.

Abbreviations and Definitions

The following abbreviations are used in the Examples:

GENEROX® generator a chlorine dioxide generator that efficiently generates an aqueous solution of chlorine dioxide in excess of 90% by chlorine/chlorite, acid/hypochlorite/chlorite or acid/chlorate sold by Drew Industrial Division, a division of Ashland Specialty Chemical, a division of Ashland Inc.

ONGUARD® IPC unit an integrated pathogen master controller unit (IPC), (sold by Drew Industrial, an operating business of Ashland Specialty Chemical, a division of Ashland Inc.) that monitors poultry chiller for operational signal, measures and compares the oxidative-reduction potential of an aqueous system in millivolts (mV), controls the operation of GENEROX® chlorine dioxide generator, measures and compares air quality, initiates alarms, and provides for data collection and storage, as well as remote and local data download capabilities.

ORP oxidative-reduction potential.

ORP analyzer measures oxidative-reduction potential in millivolts.

EXAMPLES

The examples will illustrate specific embodiments of the invention. These examples along with the written description will enable one skilled in the art to practice the invention. It is contemplated that many other embodiments of the invention will work besides these specifically disclosed. All parts are by weight and all temperatures are in ° C. unless otherwise specified. Controls or Comparative Examples are designated by letters.

Example 1

The Master Control Unit requires a signal from the chiller, indicating that there is water in the chiller, before the chlorine dioxide generators begin pumping chlorine dioxide to the chill water. The signal typically is obtained from a slipstream of water taken from the chill box and routed through the refrigeration system via a rechill pump. The refrigeration system is interlocked with the Master Control Unit. The interlock device insures that chill water is in place before chlorine dioxide is introduced to the chiller and it prevents the escape of airborne chlorine dioxide gas, which could pose a personnel hazard.

The signal indicating that the chiller is in operation is obtained before the poultry and chlorine dioxide are introduced into the chiller, and provides a reference point for the chill water. Initial chill water ORP reference point readings without poultry and $ClO_2$ present vary significantly. The reference point reading is below 400 mV, typically between −100 mV to +300 mV.

If the ONGUARD IPC unit receives an indication that the chiller is in operation, it activates a GENEROX chlorine dioxide generator connected to chill box where the chill water is stored. If there is no signal to the ONGUARD IPC unit, the GENEROX generator is not activated, so that a potential personnel hazard is averted. In order to activate flow of chlorine dioxide from the GENEROX chlorine dioxide generator to the chill water, the ORP signal for the chill water must reach a level of from 400 mV to 750 mV, most preferably from 580 mV to 680 mV.

Processed poultry is introduced to the chill water of the chiller following carcass washing after is clear that the chiller is in operation and contains chill water in the chill box. The time the birds are transported through the chiller varies based upon the type, weight and starting temperature of the carcass.

The introduction of the birds into the chill water results in decontamination of the chill water and causes the ORP to decrease. This decrease in ORP is recognized by the ONGUARD IPC unit, which activates a signal to the GENEROX generator to feed $ClO_2$ into the chill water. The ONGUARD IPC unit continuously measures the ORP of the chill water, comparing it to the reference point. If the ORP of the chill water is below the reference point, the ONGUARD IPC unit signals the GENEROX generator to start feeding the aqueous solution of chlorine dioxide. The typical concentration of the aqueous solution of $ClO_2$ is from 100 ppm to 3000 ppm, preferably 750 ppm to 2,000 ppm.

$ClO_2$ is fed directly to the chill water predominantly directly to the chill box, but also through the chill water recirculating line. As the chlorine dioxide is fed into the chill water, the ORP readings increase. Chlorine dioxide is fed to the chill water until the ORP readings achieve a preset limit, which indicates that the chill water has become decontaminated. Alternatively, the generator can proportion $ClO_2$ to the system automatically based upon a predetermined ORP level. Final ORP reading typically vary between 400 mV to 750 mV, preferably 580 mV and 680 mV, depending upon initial, pre-feed ORP, and system demand.

When feeding the chlorine dioxide, the residual chlorine dioxide concentration in the chill water should not exceed 3 ppm residual $ClO_2$, but is typically targeted between 0.1 ppm and 0.5 ppm.

To prevent overfeed of chlorine dioxide, the ONGUARD IPC will initiate a shutdown of chlorine dioxide feed if the ORP exceeds a pre-designated set point. This prevents the system from exceeding regulatory chlorine dioxide limits. In a high ORP condition, the ONGUARD IPC will initiate an alarm condition. If chlorine dioxide were underfed, a low ORP would result. If the ONGUARD IPC detects this circumstance on either the primary analyzer, secondary analyzer or both, the unit would initiate a probe wash. If the low ORP condition continues to exist, then an alarm condition will activate. This helps ensure sufficient oxidant to control pathogens.

The operating environment of the ORP sensors is less than optimal, because of the presence of greasy poultry fat or skin, which can lodge against the probe of the sensor and coat the sensor. This can result in a reading that does not accurately reflect the oxidative state of the chill water, and causes an underfeed or overfeed of chlorine dioxide.

To solve this problem, the ONGUARD IPC preferably uses two ORP analyzers and sensors, both of which monitor the chill water. Preferably, the ONGUARD IPC continuously monitors and compares the two analyzers. If a discrepancy exists between the analyzers, which exceeds a preset limit, the ONGUARD IPC immediately initiates a probe wash. If the discrepancy remains after the probe wash, the unit automatically signals an alarm condition. This redundancy ensures continuous system control for reliability, safety, and pathogen control. This automatic probe wash is in addition to that triggered by low ORP detected on either analyzer as described above. In addition to the probe wash, a fresh water back flush of the probes may also be initiated.

During the operation of the system, the ONGUARD IPC system preferably continuously monitors air quality in the vicinity of the chill water systems using multiple chlorine dioxide specific air quality monitors. The monitors take continuous air measurements and send the result to the ONGUARD IPC. In the event the air quality is unacceptable and exceeds preset limits of 0.1 ppm [equivalent to the OSHA PEL (Permissible Exposure Limit)], an alarm will be initiated. If the air quality exceeds a failsafe limit of 0.25 ppm (which has determined to be just below the OSHA STELM (Short Term Exposure Limit), the ONGUARD IPC will initiate an automatic shutdown of the generating systems and initiate a second alarm. This is a key feature of the ONGUARD IPC and is a cornerstone of the safe introduction of chlorine dioxide into the chill water system.

We claim:

1. A process for safely decontaminating the chill water used in meat processing, which comprises:
    (a) measuring the oxidative-reduction potential of the chill water in the chill bath of a chiller prior to introducing the meat to be processed and chlorine dioxide into the chill water, in order to obtain a reference oxidative-reduction potential for said chill water,
    (b) introducing the meat to be processed into the chill water,
    (c) feeding chlorine dioxide to said chill water to achieve a predetermined target oxidative-reduction potential in the chill water from 400 mV to 750 mV, wherein the concentration of chlorine dioxide fed is from 100 ppm to 3000 ppm, and wherein the amount of chlorine dioxide fed is sufficient to increase the oxidative-reduction potential of the chill water to a level that exceeds the reference oxidative-reduction potential established in (a), and achieves the target oxidative-reduction potential referenced in (c), provided that the level of chlorine dioxide in the chill water does not exceed a residual level of 3.0 ppm;
    (d) monitoring the oxidative-reduction potential of the chill water with an oxidative-reduction potential analyzer;
    (e) monitoring the level of chlorine dioxide gas in the atmosphere surrounding the chill water with an air quality monitor; and
    (f) terminating the flow of the aqueous solution of chlorine dioxide into the chill water, if the oxidative-reduction potential exceeds 750 mV, if the oxidative-reduction potential of the chill water meets the target established in (c), or if the level of chlorine dioxide gas in the atmosphere surrounding the chill water exceeds 0.3 ppm.

2. The process of claim 1 wherein said chlorine dioxide is an aqueous solution of chlorine dioxide generated on site by means of a chlorine dioxide generator achieving a generation efficiency of at least 90% and the oxidative-reduction potential is measured with an oxidative-reduction potential sensor.

3. The process of claim 2 wherein the flow of aqueous chlorine dioxide to the chill water is controlled by a master on-line control unit that receives analog and/or digital signals from the chiller, the chlorine dioxide generator, the oxidative-reduction potential analyzer, and the air quality monitor.

4. The process of claim 3 wherein the oxidative-reduction potential of the chill water and the level of chlorine dioxide gas in the atmosphere surrounding the chill are continuously and simultaneously monitored.

5. The process of claim 4 wherein the master control unit receives a signal from the chiller indicating that the chiller contains chill water and is operational before the chlorine dioxide generator is activated to supply chlorine dioxide to the chill water.

6. The process of claim 5 further comprising two or more oxidative-reduction potential sensors each connected to two or more oxidative-reduction potential analyzers, respectively, wherein the two or more oxidative-reduction potential analyzers are connected to the on-line master controller and send oxidative-reduction potential signals to the controller that are compared to each other to determine whether there is a discrepancy between them.

7. The process of claim 6 wherein predetermined target oxidative-reduction potential in the chill water is from 580 mV to 680 mV and the concentration of chlorine dioxide fed is from 750 ppm to 2000 ppm.

8. The process of claim 7 wherein the master on-line controller initiates a probe wash using a pump and/or a probe freshwater back flush if one or both of the ORP analyzers indicate a low ORP or if a discrepancy exists between the analyzers, which exceeds a limit considered to be unacceptable, and wherein an alarm is activated signaling such condition.

9. The process of claim 8 wherein an alarm is signaled when the level of chlorine dioxide gas in the atmosphere surrounding the chill water exceeds 0.1 ppm.

10. The process of claim 9 wherein the flow of the aqueous solution of chlorine dioxide into the chill water is terminated if the level of chlorine dioxide gas in the atmosphere surrounding the chill water exceeds 0.25 ppm.

11. The process of claim 10 wherein an interlocking circuit connects the on-line master control unit to the chlorine dioxide generator and terminates the flow of chlorine dioxide to the chill water if the chlorine dioxide level in the chill water or the surrounding air is unacceptable or if the target oxidative-reduction potential is met.

12. The process of claim 11 wherein an alarm is activated if the oxidative-reduction potential of the chill water is such that the chlorine dioxide level of the chill water is unacceptably high.

13. The process of claim 12 wherein the meat processed is poultry or seafood.

14. The process of claim 13 wherein all data described is collected and stored by the master control unit and is available for download either locally or remotely.

15. The process of claim 14 wherein the data is downloaded remotely by a land-based telephone line or cellular technology.

* * * * *